Sept. 1, 1964    J. K. HALE ETAL    3,146,569
HAY CONDITIONER
Filed March 26, 1963    2 Sheets-Sheet 1
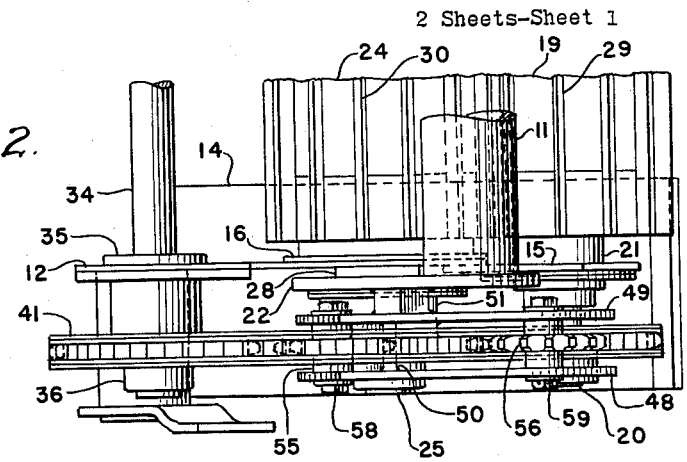
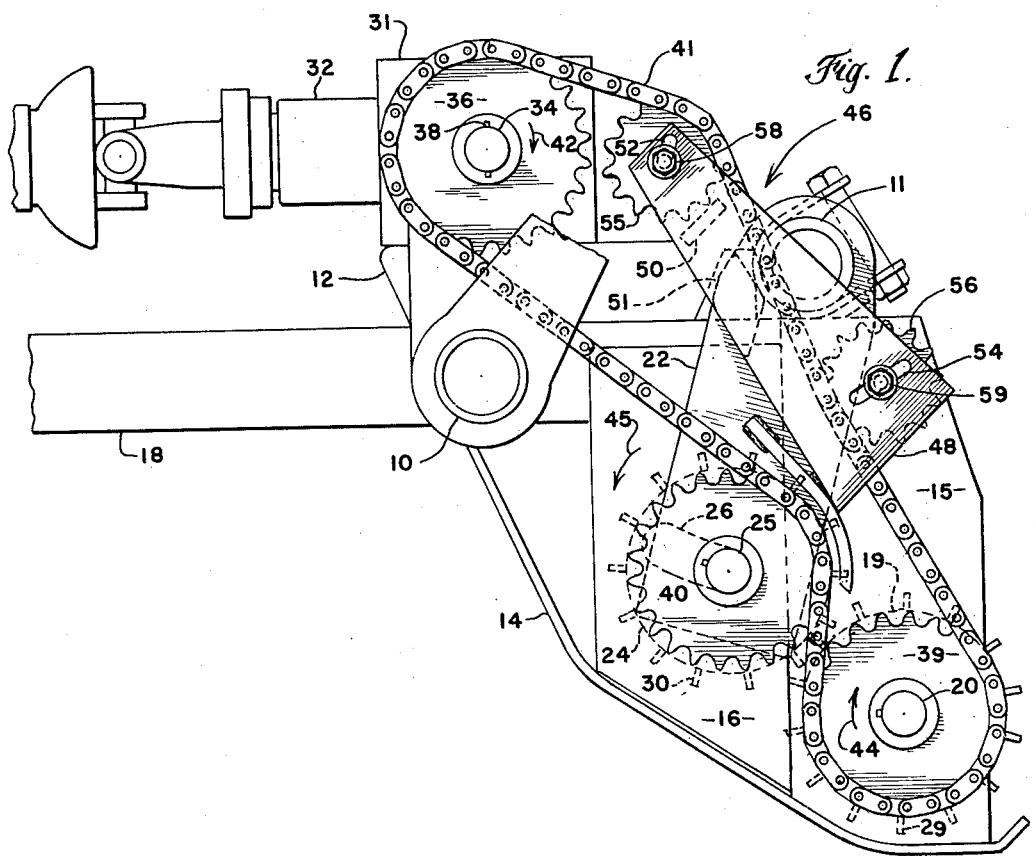
INVENTORS
JOHN K. HALE &
WARREN H. BRACKBILL
BY *Walter V. Wright*
AGENT

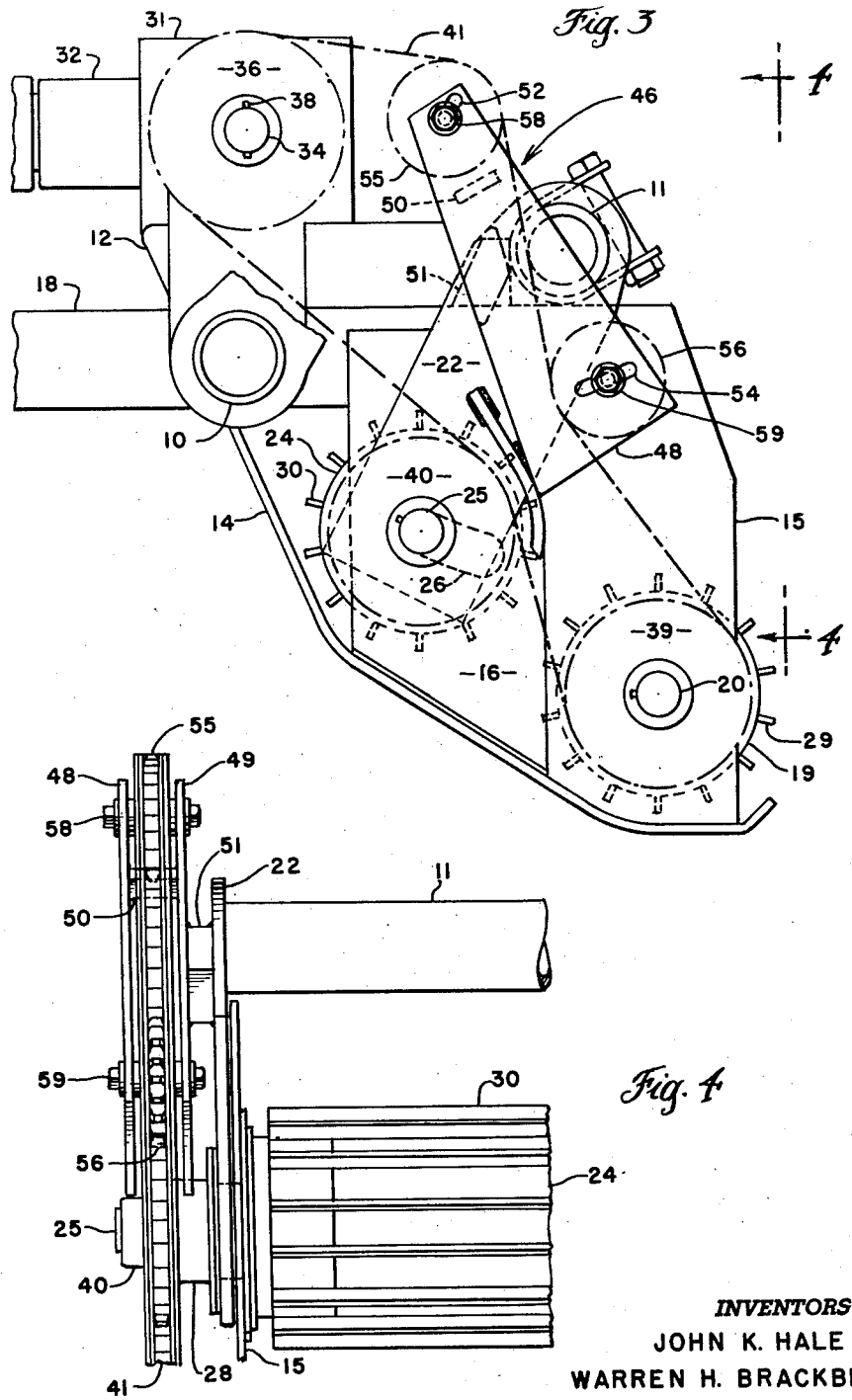

United States Patent Office 3,146,569
Patented Sept. 1, 1964

3,146,569
HAY CONDITIONER
John K. Hale, New Holland, and Warren H. Brackbill, Paradise, Pa., assignors to Sperry Rand Corporation, New Holland, Pa., a corporation of Delaware
Filed Mar. 26, 1963, Ser. No. 267,992
4 Claims. (Cl. 56—1)

This invention relates to hay conditioners. More specifically, this invention relates to improvements in hay conditioners of the type known as crimpers.

After hay is mowed it must be allowed to lie in the field for a period of time until it is sufficiently dried for baling or other harvesting procedure. While the hay leaves dry quickly, the stems ordinarily take a considerably longer period of time to dry. This drying time is greatly reduced, thus lessening the chances of the crop being rained on, if the crop is subjected to a crimping operation immediately after it is mowed. The crimping operation consists basically of feeding the hay between two rolls which have intermeshing fins. The fins crack the hard outer shell of the stems and permit the moisture to escape more readily.

In hay crimping implements, the crimping rolls should be able to separate to accommodate variations in the density of the material being crimped and to permit foreign objects such as stones or sticks to be passed between the rolls. This is generally accomplished by mounting one roll in fixed position close to the ground to serve as a combined pickup and crimping roll and by mounting the second roll forwardly and above the fixed roll for movement away from and back toward the fixed roll in response to the amount of material picked up by the fixed roll. The movable roll is spring biased toward the fixed roll.

It is essential that the two crimping rolls be driven in timed relation to each other, at least when they are in their normal close positions, in order that the intermeshing fins of the two rolls do not actually contact each other. If the fins of the two rolls contact each other, the least that can happen is noisy operation of the machine with accompanying vibrations and a tendency to chop up the material as it passes between the rolls. Generally, more severe damage will occur, such as the destruction of the crimping fins on one or both rolls or mechanical failure somewhere in the drive mechanism.

One way to time the crimping rolls is to positively drive one roll and let it drive the other roll by providing gear like elements on the rolls. One such drive is disclosed in U.S. Patent 2,954,656. One problem with this drive is that when the rolls move out of contact with each other the timed relationship of the drive is lost. When the upper roll returns to its normal position, it clashes with the fixed roll.

Attempts have been made to positively drive both rolls by providing sprockets on the roll shafts and entraining a single drive chain about both sprockets. While this arrangement operates satisfactorily under normal conditions, it has not been able to successfully cope with certain special situations which inevitably occur during a crimping operation. One such situation arises when the movable roll becomes wrapped with crop material. This, in effect, increases the diameter of the roll and, since it is spring biased toward the fixed roll, it frictionally drives the fixed roll through engagement of the wrapped material with the fins of the fixed roll at a faster speed than the drive chain is moving. This produces drive chain slack between the rolls. When the wrapped roll clears itself, it quickly moves back toward the fixed roll before the chain slack can be taken up. The teeth of the movable roll sprocket may then engage the wrong links of the slacked chain and disrupt the timed relationship of the rolls. Another situation which commonly occurs is that a foreign object, such as a stick or a stone, is picked up and moved into the bight between the crimping rolls. This causes the movable roll to jump away from the fixed roll and the movable roll sprocket to momentarily jump away from the drive chain. When the drive chain slack is taken up and the chain re-engages the movable roll sprocket, the rolls will be out of time unless the appropriate chain links happen, by chance, to engage the proper sprocket teeth.

Conventional chain tightening means, such as spring loaded sprockets, have failed to provide a satisfactory solution to this problem. They merely increase the tension under which the drive chain operates and produce chain stretch and premature wear and failure of elements of the drive chain.

It is an object of this invention to provide improved driving mechanism for hay crimper rolls.

It is another object of this invention to provide means for driving a pair of hay crimping rolls in timed relation to each other wherein sudden separation of the crimping rolls will not disrupt the roll timing.

It is another object of this invention to provide timed drive mechanism for a hay crimper wherein wrapping of the rolls with material will not disrupt the roll timing.

It is another object of this invention to provide a hay crimper wherein the crimping rolls become wrapped with crop material less frequently and less severely than in prior crimping implements.

It is another object of this invention to provide a rugged, economical and dependable drive mechanism for a hay crimper.

These and other objects and advantages of this invention will be apparent upon reference to the following description and claims taken in conjunction with the accompanying drawings wherein:

FIG. 1 is a fragmentary side elevational view of a hay crimper embodying drive mechanism constructed in accordance with the principles of this invention;

FIG. 2 is a fragmentary plan view of the structure shown in FIG. 1;

FIG. 3 is a diagrammatic side elevational view similar to FIG. 1 with the upper crimping roll separated from the lower crimping roll; and FIG. 4 is a fragmentary rear elevational view taken generally on the line 4—4 of FIG. 3.

Referring now to the drawings in detail, particularly FIG. 1: the hay crimper includes a base frame structure having front and rear horizontal cross frame members 10 and 11, respectively, extending transverse to the direction of ground travel. As shown in FIG. 1, the hay conditioner would normally be towed from right to left. A fore-and-aft extending upper side frame member 12 is provided adjacent each end of the cross frame members 10 and 11. This hay conditioner, like most hay conditioners, is generally symmetrical to a fore-and-aft extending vertical plane through the line of draft; therefore, only the side of the implement carrying the drive train has been shown. All the structure other than the drive train is duplicated on the side of the conditioner not shown in these drawings. Extending downwardly and rearwardly from upper fore-and-aft frame member 12 is a combined forward and lower frame member 14 which, as may be seen in FIG. 2, serves as a lower shield for the ends of the hay crimping rolls and the roll drive mechanism. Extending vertically between upper side frame member 12 and lower frame member 14 at the rear of the machine is a frame side plate 15. Just forwardly of side plate 15 is another vertical side plate 16 which also rigidly interconnects frame members 12 and 14. Extending forwardly from the center of the machine is a drawbar 18 adapted to be connected to a tractor in the conventional manner for towing the implement. A pair of ground wheels (not shown) are provided at each side of the frame as is customary in this art. The wheels are preferably journalled in arms (not shown) carried by the outer ends of forward cross frame member 10.

A first, or lower, crimping roll 19 extends transversely between the rear side plates 15 of the frame and has a shaft 20 projecting from each end of the roll. The shaft 20 is journalled in suitable bearings 21 (FIG. 2) carried by the plates 15. Thus, the first roll 19 is journalled in a fixed position on the frame in close proximity to the ground.

At each side of the machine, on the outboard side of plates 15 and 16, a swing arm 22 depends downwardly and forwardly from rear cross frame member 11. The arms 22, one at each side of the machine, are adapted to swing forwardly and upwardly away from roll 19 about the axis of transverse frame member 11. As is conventional, springs (not shown) bias the arms 22 counterclockwise, about the axis of shaft 11, toward fixed conditioning roll 19. A second, or movable, conditioner roll 24 extends transversely between forward side plates 16 of the frame. A shaft 25 projects from each end of movable crimping roll 24 and extends through an arcuate slot 26 in each of the forward side plates 16. The shaft 25 is journalled in bearings 28 (FIG. 2) carried by the lower ends of swing arms 22. In this manner, the upper crimping roll 24 is mounted for swinging movement away from the back toward lower crimping roll 19 and is biased toward the lower roll. Each of the crimping rolls 19 and 24 is provided with longitudinally extending radial fins 29 and 30, respectively. As best seen in FIG. 1, when the crimper rolls are in their normal or close together position, the fins 29 and 30 intermesh but do not contact each other.

The crimping rolls 19 and 24 are driven in timed relation to each other by the following mechanism: a gearbox 31 is carried by the frame structure at the center forward part of the machine. A drive shaft 32 extends forwardly from the gearbox to the rear portion of the tractor where it is connected to the power-take-off mechanism (not shown) of the tractor. An output shaft 34 extends from the gearbox transversely across the upper forward portion of the frame and has its end portion journalled in a bearing member 35 carried by the upper portion of side frame member 12. The shaft 34 projects through the bearing member 35 and carries a drive sprocket 36 at its outer end. Sprocket 36 is keyed to shaft 34 as shown at 38 in FIG. 1. The shaft 20 of fixed crimper roll 19 has a sprocket 39 keyed thereto at its outer end. Shaft 25 of movable crimper roll 24 has a sprocket 40 keyed to its outer end. The drive sprocket 36 and the driven sprockets 39 and 40 all lie in a common vertical plane at one side of implement. An endless roller-type chain 41 is entrained about sprockets 36, 39 and 40 and extends in relatively straight reaches between these respective sprockets. The direction of rotation of drive sprocket 36 is indicated by the arrow 42 shown thereon. The arrow 44 shown on sprocket 39 indicates the direction of rotation of sprocket 39 and lower roll 19. The arrow 45 shown forwardly and above upper, or movable, crimper roll 24 indicates the direction of rotation of this sprocket and roll. The rotation of the crimper rolls 19 and 24 is such that the fins 29 on lower roll 19 move forwardly and upwardly into cut crop material lying on the ground and carry this material upwardly and rearwardly between the intermeshing fins 29 and 30 of the crimper rolls 19 and 24. This operation serves to crack the hard outer shell of the stems of the material at intervals substantially equal to half the circumferential spacing between two adjacent fins of one of the crimper rolls. As the rolls are driven at relatively high speeds, the material leaving the crimping rolls is thrown upwardly and rearwardly from the machine whereupon it falls back onto the ground again. The ability of the upper crimper roll 24 to swing away from lower crimping roll 19 about the axis of cross frame member 11 enables the machine to travel through a field at a constant ground speed even though the density of the material lying on the ground will vary from one spot in the field to the next. When a heavy mass of material is encountered, the upper roll 24 will be lifted away from lower roll 19 by the crop material to a position such as that shown in FIG. 3 of the drawings. The same thing will occur should one of the crimper rolls become wrapped with crop material.

In FIG. 1 it will be seen that drive chain 41 has approximately ninety degrees of wrap around upper roll sprocket 40. The chain travels substantially through a ninety degree angle in moving from lower roll sprocket 39 up to drive sprocket 36. When upper roll 24 moves away from lower roll 19 to the position shown in FIG. 3, the upper roll sprocket 40 moves forwardly away from the normal path of travel of the drive chain 41. This tends to produce slack in the forward reach of the drive chain, thus increasing the chances of sprocket 40 and chain 41 jumping out of timing particularly if the roll movement is sudden. To prevent loss of crimper roll timing, with upper roll 24 continually floating between the FIG. 1 and FIG. 3 positions, virtually no slack may be allowed to develop in drive chain 41.

In the drive of present invention, the tension of drive chain 41 is maintained and slack is prevented from forming by the mechanism indicated, generally, by the reference numeral 46. This mechanism comprises a pair of elongated plates 48 and 49 which are welded to opposite sides of a spacer member 50 to form a rigid arm structure. The arm structure is rigidly attached to the upper crimper roll swing arm 22 with plates 48 and 49 extending along the rear reach of drive chain 41 and being respectively disposed on opposite sides of the drive chain. A mounting block 51, best seen in FIGS. 2 and 4, is welded to swing arm 22, and the inboard plate 49 of the arm structure is welded to block 51. At the forward end of each of the arm plates 48 and 49 a slot 52 is provided. A similar slot 54 is provided at the rear end of each of the plates 48 and 49. A first idler sprocket 55 is disposed between the forward ends of plates 48 and 49. Sprocket 55 engages the under side of drive chain 41 and is journalled in the forward slots 52 in plates 48 and 49. A second idler sprocket 56 is journalled in rear slots 54 in the plates 48 and 49. Sprocket 56 is disposed between plates 48 and 49 and engages the upper side of drive chain 41. The slots 52 and 54 allow idler sprockets 55 and 56 to be moved toward or away from chain 41 to initially establish proper drive chain tension and to facilitate periodic adjustment in compensation for chain stretch and wear. In operation, the sprockets 55 and 56 are locked in fixed positions in slots 52 and 54 by the bolts 58 and 59 on which the idlers are journalled.

With the above arrangement, the idlers 55 and 56 are fixed relative to movable crimper roll 24 and its sprocket 40. Any movement of roll 24 tending to produce slack in chain 41 is accompanied by positive movement of idlers 55 and 56 tending to take up an equal amount of slack in chain 41; consequently, no slack can be produced in chain 41 by movement of roll 24. Since none of the sprockets can move relative to chain 41 unless accompanied by an equal and opposite movement of one or more of the other sprockets, the tension on drive chain 41 is maintained during any movement of roll 24.

The drive chain tension can be set initially to provide maximum service life of the parts of the drive train.

With the above drive structure, separation of the crimper rolls produces no drive chain slack. Should the upper roll begin to wrap with material and attempt to frictionally drive the lower roll, there is no slack chain, or yieldable chain tensioner, from which the lower roll can draw chain to produce slack between the crimper roll sprockets. Consequently, the lower roll will not speed up; instead, it bites more aggressively into the wrapped material and promptly tears the material from the upper roll thus clearing the wrapped roll.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A hay conditioner comprising a frame adapted to be towed over the ground in a forward direction, a first roll journalled on said frame in close proximity to the ground and extending transverse to the direction of travel of said frame, a second roll journalled on said frame and disposed generally forwardly of and above said first roll and extending parallel to said first roll, said first and second rolls each having longitudinally extending radial fins intermeshing to crack the stems of crop material that is moved between the rolls, a first sprocket carried by said first roll at one end thereof, a second sprocket carried by said second roll at one end thereof, a drive sprocket journalled on said frame, an endless chain entrained around said first and second sprockets and said drive sprocket and driving said first and second sprockets, and thereby said rolls, in timed relation to each other in a direction whereby said first roll picks up cut crop material lying on the ground and carries said material upwardly and rearwardly between the intermeshing fins of the rolls, means mounting said second roll on said frame for movement away from and back toward said first roll in response to varying amounts of cut crop material being picked up and carried between said rolls by said first roll, and means to vary the path of travel of said chain and prevent the formation of drive chain slack upon movement of said second roll away from and toward said first roll, said slack preventing means comprising a pair of spaced apart members respectively engaging opposite sides of said drive chain, and means mounting said members on said frame in fixed positions relative to said second roll for movement relative to said drive chain as a unit with said second roll upon movement of said second roll away from and toward said first roll.

2. A hay conditioner comprising a frame adapted to be towed over the ground in a forward direction, a first roll journalled on said frame in close proximity to the ground and extending transverse to the direction of travel of said frame, a second roll journalled on said frame and disposed generally forwardly of and above said first roll and extending parallel to said first roll said first and second rolls each having longitudinally extending radial fins intermeshing to crack the stems of crop material that is moved between the rolls, a first sprocket carried by said first roll at one end thereof, a second sprocket carried by said second roll at one end thereof, a drive sprocket journalled on said frame, an endless chain entrained around said first and second sprockets and said drive sprocket and driving said first and second sprockets, and thereby said rolls, in timed relation to each other in a direction whereby said first roll picks up cut crop material lying on the ground and carries said material upwardly and rearwardly between the intermeshing fins of the rolls, means mounting said second roll on said frame for movement away from and back toward said first roll in response to varying amounts of crop material being picked up and carried between said rolls by said first roll, and means to vary the path of travel of said chain and prevent the formation of drive chain slack upon movement of said second roll away from and toward said first roll, said slack preventing means comprising a pair of idler sprockets spaced apart along said drive chain and respectively enmeshed with opposite sides of said drive chain, and means journalling said sprockets on said frame in fixed positions relative to said second roll for movement relative to said drive chain as a unit with said second roll upon movement of said second roll away from and toward said first roll.

3. A hay conditioner as recited in claim 2 wherein said means journalling said idler sprockets on said frame in fixed positions includes adjusting means selectively operable to vary the fixed position of at least one of said idler sprockets to compensate for chain wear and to facilitate the initial establishment of proper drive chain tension.

4. A hay conditioner comprising a frame adapted to be towed over the ground behind a tractor, a drive shaft extending forwardly from said frame and adapted to be connected to a source of power on the tractor, a drive sprocket journalled on said frame at one side thereof for rotation in a vertical plane and operatively connected to said drive shaft, a first horizontally disposed roll journalled on said frame in close proximity to the ground and extending transverse to the direction of travel of said frame, a first sprocket fixedly carried by said first roll at one end thereof and disposed in the same vertical plane as said drive sprocket, a pair of generally vertically extending support arms respectively disposed at opposite sides of said frame, a second roll extending between the lower ends of said arms and having its respective ends journalled on said arms, said second roll being disposed forwardly of and above said first roll and extending parallel to said first roll, a second sprocket fixedly carried by said second roll at one end thereof and disposed in the same vertical plane as said drive sprocket and said first sprocket, said first and second rolls each having longitudinally extending radial fins intermeshing to crack the stems of crop material that is moved between the rolls, horizontal pivot means mounting the upper ends of said arms on said frame whereby said second roll is swingable away from and back toward said first roll in response to varying amounts of crop material passing between said rolls, an endless chain entrained around said first and second sprockets and said drive sprocket and having reaches extending between said sprockets, said drive sprocket driving said chain, said first and second sprockets, and thereby said rolls, in timed relation to each other in a direction whereby said first roll picks up cut crop material lying on the ground and carries said material upwardly and rearwardly between the intermeshing fins of the rolls, an idler arm rigidly mounted on the support arm of said second roll at the sprocket end of the roll for movement along with said support arm when said second roll swings away from and back toward said first roll, said idler arm extending generally parallel to one of said drive chain reaches, a pair of idler sprockets disposed in the vertical plane of said first and second sprockets, means journalling one of said idler sprockets in a fixed position on said idler arm and in engagement with one side of said drive chain, means journalling the other of said pair of idler sprockets on said idler arm in a fixed position spaced from said one idler sprocket along said drive chain reach and in engagement with the other side of said drive chain whereby upon movement of said second roll relative to said first roll said idler sprockets move a proportionate amount relative to said drive chain to vary the path of said drive chain and prevent the formation of slack in the chain.

References Cited in the file of this patent

UNITED STATES PATENTS

| | | |
|---|---|---|
| 1,977,720 | Fowler | Oct. 23, 1934 |
| 2,924,927 | Pristo | Feb. 16, 1960 |
| 2,963,841 | Cunningham | Dec. 13, 1960 |